(12) United States Patent
Ghirardi et al.

(10) Patent No.: US 10,890,284 B2
(45) Date of Patent: Jan. 12, 2021

(54) PROFILED CLAMP

(71) Applicant: NORMA Germany GmbH, Maintal (DE)

(72) Inventors: Fabio Ghirardi, Hanau (DE); Viktor Stoll, Großkrotzenburg (DE); Gerrit von Breitenbach, Karlstein (DE); Manuel Baudoin, Newbury (GB); Brian Geese, Clarkston, MI (US)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 16/465,752

(22) PCT Filed: Nov. 29, 2017

(86) PCT No.: PCT/EP2017/080755
§ 371 (c)(1),
(2) Date: May 31, 2019

(87) PCT Pub. No.: WO2018/099940
PCT Pub. Date: Jun. 7, 2018

(65) Prior Publication Data
US 2019/0390806 A1 Dec. 26, 2019

(30) Foreign Application Priority Data
Dec. 2, 2016 (DE) .......... 10 2016 123 388

(51) Int. Cl.
*F16L 33/04* (2006.01)
*F16L 23/08* (2006.01)

(52) U.S. Cl.
CPC ............... *F16L 33/04* (2013.01); *F16L 23/08* (2013.01)

(58) Field of Classification Search
CPC ......... F16L 33/04; F16L 21/065; F16L 23/08; F01N 13/1805
See application file for complete search history.

(56) References Cited

U.S. PATENT DOCUMENTS 4,056,273 A 11/1977 Cassel
4,813,720 A * 3/1989 Cassel ................. F01N 13/1805
285/419

(Continued)

FOREIGN PATENT DOCUMENTS

KR 20120087085 A 8/2012

OTHER PUBLICATIONS

First German Office Action for Application No. 10 2016 123 388.9 dated Sep. 15, 2017, 4 pages.

(Continued)

*Primary Examiner* — Robert Sandy
*Assistant Examiner* — Louis A Mercado
(74) *Attorney, Agent, or Firm* — Reising Ethington, P.C.

(57) ABSTRACT

A profiled clamp with a clamping band and a clamping device. The ends of the clamping band each have a clamping head which protrudes radially with respect to a receiving space. The clamping device has two clamping parts and an elongate clamping element connecting the clamping parts. The clamping element extends through the openings in the clamping heads and presses the clamping parts against the clamping heads. The profiled clamp has intermediate elements which are provided between the clamping heads and the clamping parts. The intermediate elements have cutouts through which the clamping element extends, and an application surface for contact against the clamping head.

12 Claims, 4 Drawing Sheets

(56) References Cited

U.S. PATENT DOCUMENTS

| | | | | |
|---|---|---|---|---|
| 6,796,004 B2* | 9/2004 | Belisle | ................. | F16L 21/065 |
| | | | | 24/279 |
| 7,052,052 B2* | 5/2006 | Protas | ................. | F16L 21/065 |
| | | | | 285/419 |
| 7,997,626 B2* | 8/2011 | Krausz | ................. | F16L 21/022 |
| | | | | 285/110 |
| 8,978,212 B2 | 3/2015 | Krueger | | |
| 9,835,277 B2* | 12/2017 | Chiproot | ............... | F16L 55/178 |
| 2004/0068847 A1 | 4/2004 | Belisle et al. | | |
| 2004/0216284 A1 | 11/2004 | Belisle et al. | | |
| 2005/0039306 A1 | 2/2005 | Logan et al. | | |
| 2008/0184536 A1 | 8/2008 | Rigollet et al. | | |
| 2010/0115733 A1 | 5/2010 | Bouchlat et al. | | |
| 2010/0223764 A1 | 9/2010 | Prevot et al. | | |
| 2012/0145270 A1* | 6/2012 | Krausz | ................. | F16L 21/065 |
| | | | | 138/97 |

OTHER PUBLICATIONS

International Search Report for Application No. PCT/EP2017/080755 dated Feb. 13, 2018, 5 pages.
English Translation of the International Search Report for Application No. PCT/EP2017/080755 dated Feb. 13, 2018, 3 pages.
First Chinese Office Action for Application No. 201780071816.5 dated Apr. 17, 2020, 6 pages.
English translation of First Chinese Office Action for Application No. 201780071816.5 dated Apr. 17, 2020, 6 pages.
Korean Office Action for Korean Application No. 10-2019-7019006 dated Aug. 25, 2020 (7 pages).
English Translation of Korean Office Action for Korean Application No. 10-2019-7019006 dated Aug. 25, 2020 (7 pages).

* cited by examiner

PROFILED CLAMP

INTRODUCTION

The disclosure relates to a profiled clamp.

Profiled clamps are used frequently for connecting piping. The profiled clamp is pushed over the pipe by way of a tensioning band. The tensioning heads of the profiled clamp are then moved toward one another by tensioning the tensioning device, as a result of which the internal diameter or the receiving space of the profiled clamp is reduced and a radially inwardly directed tensioning force is exerted on the pipe. The pipe is able to be clamped on a further pipe or on a tensioning head as a result.

The profiled clamp has a substantially U-shaped tensioning band. The pipes to be connected have a radially protruding, circumferential flange. The profiled clamp is positioned for connecting the pipes such that the flanges of the pipes project into the U-shaped tensioning band. The legs of the U-shaped tensioning band extend at an angle so that when the tensioning band is tensioned, in addition to the radially acting tensioning force, an axial—with reference to the pipes—tensioning force is exerted onto the flanges, by means of which the flanges are pressed toward one another such that they abut against one another, as a result of which sealing is effected between the pipes.

As a result of the forces exerted onto the tensioning heads by the tensioning device, stresses occur inside the tensioning band which can have disadvantageous effects on the long-term durability. In particular where there are large temperature differences, the holding forces provided by the profiled clamp can be negatively influenced as a result.

SUMMARY

It is one object according to an embodiment to provide a profiled clamp with an improved distribution of stress inside the tensioning band, in particular in the event of changes in temperature.

In the case of a profiled clamp with a tensioning band and a tensioning device, wherein the tensioning band comprises at each end a tensioning head which protrudes radially in a substantial manner with reference to a receiving space which is defined by the profiled clamp, said tensioning heads each having an opening, and wherein the tensioning device comprises two tensioning parts and one elongated tensioning element which connects the tensioning parts, wherein the tensioning element extends through the openings of the tensioning heads and presses the tensioning parts against the tensioning heads, it is provided that the profiled clamp comprises intermediate elements which are provided between the tensioning heads and the tensioning parts, wherein the intermediate elements comprise recesses, through which the tensioning element extends, as well as an abutment surface for abutment against the tensioning head, wherein the abutment surface is realized in such a manner that the abutment point between the intermediate element and the tensioning head, at least in a tensioning position in which the tensioning heads are parallel to one another or are angled with respect to one another, is located in each case closer in the radial direction to the receiving space than the center axis of the tensioning element.

In the tensioning position, the tensioning heads are pressed against one another by the tensioning device such that the tensioning band abuts circumferentially against one or multiple pipelines.

As the abutment point, that is to say the point of application of the tensioning device on the tensioning heads, is located closer to the receiving space than the center axis of the tensioning element, unwanted stresses in the tensioning heads are avoided or at least reduced, as the lever arm between the abutment point and a base point of the tensioning heads which is provided in each case at the transition between the tensioning heads and the tensioning band is clearly shorter. As a result, less deformation of the tensioning heads occurs when the tensioning device is tensioning such that it is possible to introduce tensioning forces into the tensioning band in a more effective manner.

In addition, the point of application of the tensioning device is able to be repositioned closer to the base point independently of the form of the tensioning device as a result of the intermediate elements. In particular, as a result of selecting suitable intermediate elements it is possible to use different tensioning devices so that flexible adaptation of the profiled clamp is possible. Independently of the selected tensioning device, the intermediate elements can be chosen in each case such that the point of abutment between the intermediate elements and the tensioning heads is located in each case closer radially to the base point of the respective tensioning head than the center axis of the tensioning element.

As the adaptation to the tensioning device is effected by means of the intermediate elements, it is also possible for the tensioning heads to be realized in a symmetrical manner so that an alignment of the profiled clamp, for example for actuation of the tensioning device, is not necessary. Said tensioning device can be mounted on the tensioning heads in an arbitrary alignment after pre-assembly of the profiled clamp.

The tensioning band is curved, for example, about the receiving space and the tensioning heads each comprise a portion which connects directly to the respective end of the tensioning band and is curved in the opposite direction to the curvature of the tensioning band, wherein the abutment points are each located on the curved portion of the tensioning heads.

The intermediate elements can comprise a rounded abutment surface so that even if the tensioning head is deformed or the position of the tensioning heads is modified, for example when the tensioning heads are tightened by the tensioning device, the abutment point is located below the center axis of the tensioning element in the radial direction. In particular, the abutment surface is curved in a convex manner. In particular, the curvature of the abutment surfaces is smaller than the curvature of the curved portions of the tensioning heads.

The abutment surfaces can also each comprise a projection which protrudes in the circumferential direction, wherein the projection is provided in each case further inside in the radial direction than the opening of the tensioning head. As a result of the projection, it is possible to choose the abutment point to the greatest possible extent independently from the alignment of the tensioning heads. The projection may be preferably chosen such that the projection abuts exclusively against the respective tensioning head even when the tensioning heads are angled away from one another or toward one another. For example, the intermediate element is produced from a metal sheet and the projection is bent from the metal sheet as a result of stamping or punching.

Interacting holding elements, which fix the intermediate elements in the radial direction and in a rotational direction about the longitudinal axis of the tensioning element, may be preferably provided on the intermediate elements and the tensioning heads. If the tensioning heads are not aligned in parallel with one another, the tensioning device, during tensioning, can be urged to the ends of the tensioning heads which are located more closely together. If the tensioning heads are angled, for example, toward one another, the tensioning device, during tensioning, could wander radially outward. This would enlarge the lever arm, as a result of which there could be higher stresses in the tensioning band. In addition, the tensioning device could be urged against the edge of the respective opening, as a result of which the material of the tensioning heads could be loaded in said regions. The intermediate elements and consequently also the tensioning device are fixed in the radial direction by means of the holding elements so that increased stress on the tensioning heads is avoided. The non-rotational fixing also ensures that the intermediate elements always have the desired alignment on the tensioning heads. For example, part of the tensioning device can also be non-rotationally fixed on one of the intermediate elements and consequently on a tensioning head.

The holding elements can each be formed, for example, by at least one recess on the intermediate element or on the tensioning head and at least one projection which is provided on the tensioning head or the intermediate element and protrudes into the recess. In particular, the projection protrudes in the circumferential direction with reference to the receiving space and the recess is open in the circumferential direction. The intermediate elements can be fixed in a simple manner by pushing the recess onto the projection.

For example, the projection is bent, in particular punched, from the tensioning head or the intermediate element, as a result of which it is possible to produce the projection in a simple manner.

The intermediate element may preferably comprise a reception for a filler or a tensioning part of the tensioning device. The filler can comprise, for example, a support function for the intermediate element or can provide an abutment for a tensioning part which makes it possible for the tensioning part to abut flatly against the filler and consequently against the intermediate element. The filler is held in a desired orientation in the reception. If a tensioning part is held in the reception, it can be held such that connection to the tensioning element and tensioning of the tensioning device is possible. For example, the tensioning part is a nut which has an internal thread and is held in the reception in the circumferential direction, in the radial direction and in the rotational direction about the longitudinal axis of the tensioning element.

For example, a tensioning part with an internal thread can be provided in a reception and a filler with a cylindrical recess can be provided in the second reception. The filler can provide a flat abutment for a head of the tensioning element, for example a screw head. The other intermediate element fixes the tensioning part which is realized as a nut. The tensioning device is consequently able to be mounted in a simple manner on the tensioning band.

The intermediate element can also surround the reception in a circumferential direction and consequently comprise an abutment for a tensioning part.

The tensioning heads may be preferably realized at an angle with respect to one another.

Mutually opposite contact surfaces, which move into abutment with one another when the tensioning heads are tightened, can be provided on the radially outer ends of the tensioning heads.

The tensioning heads and the tensioning band can each comprise a U-shaped cross section at least in portions. The U-shaped cross section can be interrupted by flat portions in order to increase the flexibility of the tensioning band.

The U-shaped cross section can be modified in the radial direction in the region of the tensioning head and/or in the circumferential direction in the region of the clamp band. For example, the cross section can be adapted to the anticipated loads. The cross section can be adapted, for example, by adapting the length, the thickness or the form to the base and/or the legs of the U-shaped cross section. As an alternative to this, it is possible to modify the angle between the legs and the base. The cross section can be different in portions or can be modified continually.

BRIEF DESCRIPTION OF THE FIGURES

Further features, details and advantages of the disclosure are produced from the wording of the claims and from the following description of exemplary embodiments by way of the drawings, in which:

DETAILED DESCRIPTION

Figure 1:
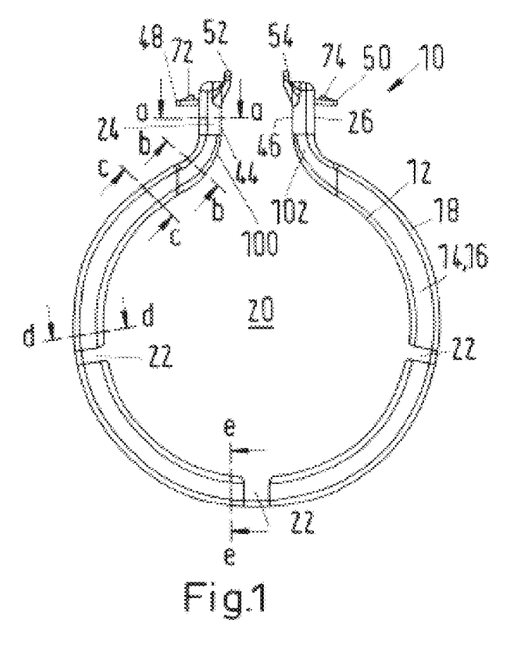
FIG. 1 shows a tensioning band of a profiled clamp.
Figure 2:
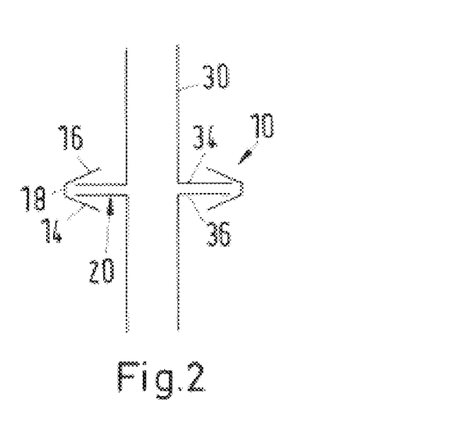
FIG. 2 shows a schematic representation of a pipeline assembly with a profiled clamp.
Figure 3:
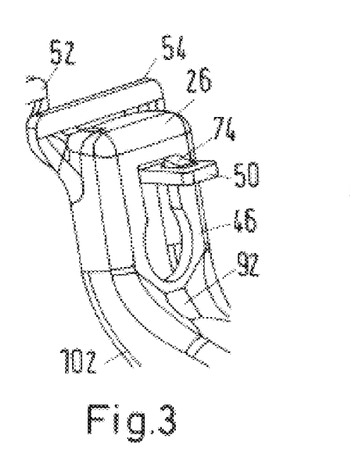
FIG. 3 shows a view of a detail of the tensioning head of the profiled clamp from FIG. 1.
Figure 4:
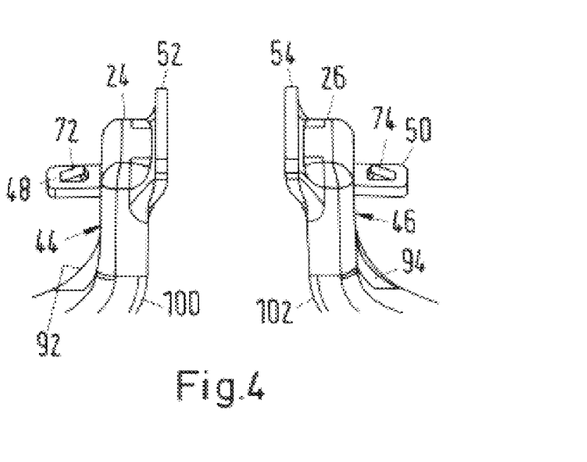
FIG. 4 shows a second view of a detail of the tensioning head of the profiled clamp from FIG. 1.

FIG. 1 shows a tensioning band 12 of a profiled clamp 10. The tensioning band 12 has a substantially U-shaped cross section with two legs 14, 16 which are angled relatively with respect to one another and a connecting region 18 (see FIG. 2 also) and delimits a receiving space 20. The legs 14, 16 comprise multiple interruptions 22 so that the tensioning band 12 is realized in a more flexible manner. In addition, the tensioning band 12 comprises two tensioning heads 24, 26 which protrude radially with reference to the receiving space 20, with which tensioning heads a tensioning device 28 (see FIGS. 6 and 8) is able to cooperate for tensioning the tensioning band 12.

Figure 6:
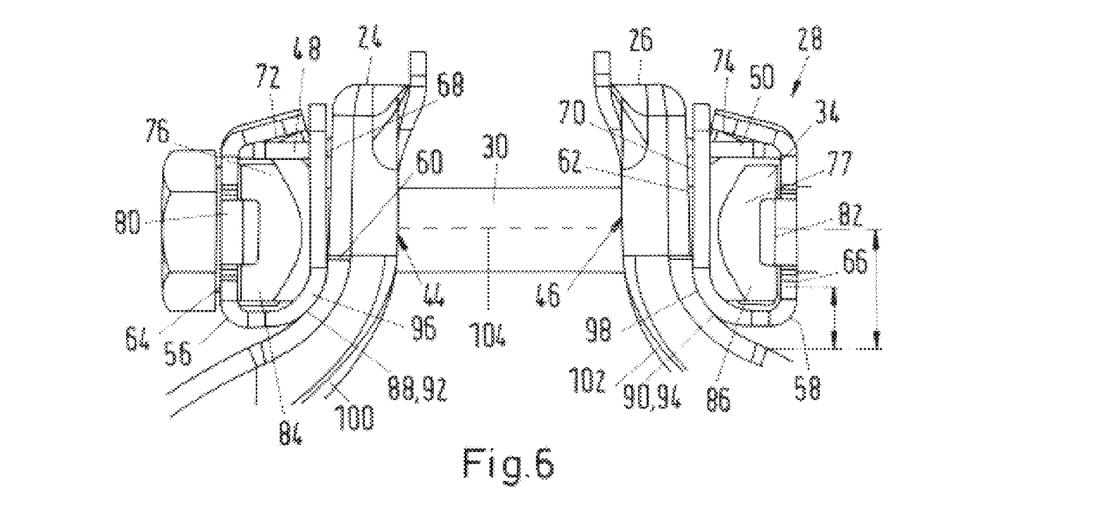
FIG. 6 shows a part view of a profiled clamp with the tensioning band from FIG. 1 and the intermediate element from FIG. 5.
Figure 8:
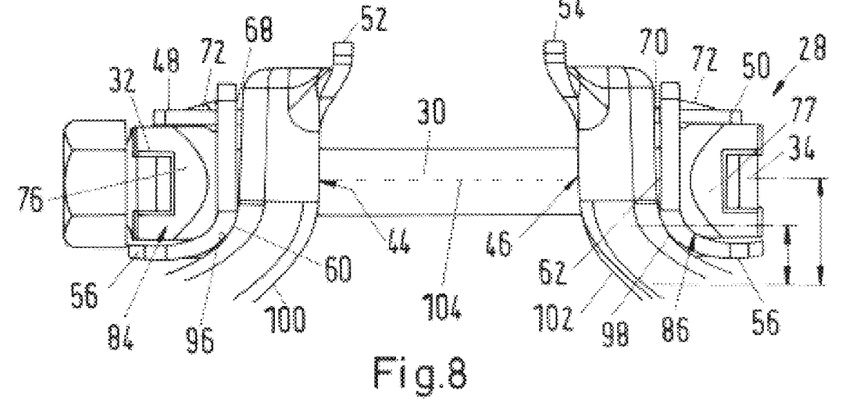
FIG. 8 shows a part view of a profiled clamp with the tensioning band from FIG. 1 and the intermediate element from FIG. 7.

The tensioning device 28 comprises a tensioning element 30 and two tensioning parts 32, 34 which can be moved toward one another by means of the tensioning element 30, as a result of which the tensioning heads 24, 26 are able to be pressed against one another.

The profiled clamp 10 serves for connecting two pipes 36, 38 (see FIG. 2) which each comprise a radially protruding flange 40, 42 at one end. The pipes 36, 38 are positioned next to one another with the flanges 40, 42 and the profiled clamp 10 is placed over the two flanges 40, 42 so that the flanges 40, 42 are located in the receiving space 20. The tensioning band 12 is then tensioned with the tensioning device 28 such that the legs 14, 16 abut against the flanges 40, 42 and press them against one another.

The tensioning heads 24, 26 are designed symmetrically and each comprise a U-shaped cross section at least in portions. An opening 44, 46, through which the tensioning element 30 of the tensioning device 28 is able to extend, is provided on each tensioning head 24, 26.

Projections 48, 50, which protrude in the circumferential direction U of the tensioning band 12 on each of the sides that face away from one another and are each bent from the metal sheet of the tensioning head 24, 26, are additionally provided on the tensioning heads 24, 26. On the radially outer ends of the surfaces that face one another, the tensioning heads each comprise a contact surface 52, 54, the contact surfaces 52, 54 being located opposite one another such that they are able to abut against one another when the tensioning band 12 is tensioned.

In addition, the profiled clamp 10 comprises intermediate elements 56, 58 which are arranged between the tensioning heads 24, 26 and the tensioning parts 32, 34. The intermediate elements 56, 58 are each formed from a metal sheet by bending and comprise an abutment surface 60, 62 for abutment against the tensioning heads 24, 26 and an abutment 64, 66 which is arranged on an opposite surface. A tensioning part 32 can be placed against the abutment 64 as is explained below.

Recesses 68, 70, by way of which the intermediate elements 56, 58 can be pushed onto the projections 48, 50 on the tensioning heads 24, 26, are provided on the abutment surfaces 60, 62. Latching elements 72, 74, which each latch in the recess 68, 70 and prevent the intermediate element 56, 58 slipping from the projection 48, 50, are provided on each of the projections 48, 50. The projections 48, 50 and the recesses 68, 70 each form interacting holding elements which fix the intermediate element 56, 58 in each case in the radial direction and in a rotational direction about the tensioning element on the tensioning head 24, 26.

Figure 5:
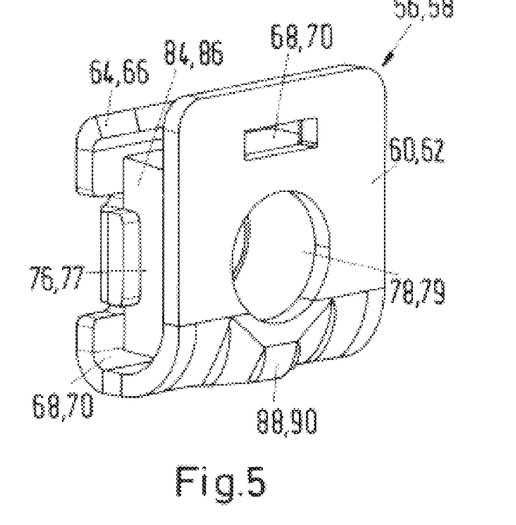
FIG. 5 shows a first embodiment of an intermediate element for use with the tensioning band from FIGS. 3 and 4.

In addition, the intermediate elements 56, 58 comprise a filler 76, 77 which is inserted between the abutment surface 60, 62 and the abutment 64, 66. Bores, which form a recess 78, 79 which extends through the intermediate element and through which the tensioning element 30 is able to extend, are provided on each of the fillers 76, 77, the abutment surfaces 60, 62 and the abutments 64, 66. Plates 80, 82, which fix the filler 76, 77 in a reception 84, 86 of the respective intermediate element 56, 58, are provided on each of the intermediate elements 56, 58.

For example, an internal thread can be provided in the bore of a filler 76, 77 and the tensioning element 30 comprises a corresponding external thread so that the filler 77 forms a tensioning part 34. The second tensioning part 32 is fixedly connected to the tensioning element 30 and preferably comprises a torque transmission profile.

As an alternative to this, the filler 77 can also comprise, analogously to the filler 76, just a recess 79, through which the tensioning element 30 extends, and the tensioning element 34 is an element which is separate from the filler 77 and abuts against the abutment 66.

The intermediate elements 56, 58 by way of the abutment surfaces 60, 62 are pressed against the tensioning heads 24, 26 by means of the tensioning device 28 or the tensioning parts 32. There is therefore a transmission of force from the tensioning device 28 or the tensioning parts 32 to the intermediate elements 56, 58 and further to the tensioning heads 24, 26.

As can be seen in FIG. 5, the abutment surface 60, 62 of the intermediate elements 56, 58 is rounded at the radially inner edge when mounted on the tensioning band 12 and comprises a projection 88, 90 which, when mounted, protrudes in the circumferential direction to the tensioning head 24, 26. An indentation 92, 94, in which the projection 88, 90 is able to engage, is provided on each of the tensioning heads 24, 26.

As can be seen in FIG. 6, the intermediate elements 56, 58 abut against the tensioning heads 24, 26 simply by way of the projections 88, 90. The tensioning part 32 abuts flatly against the abutment 64 so that an optimum transmission of force is ensured. The abutment point 96, 98, by way of which the intermediate elements 56, 58 abut against the tensioning heads 24, 26, is located as a result very close to the base points 100, 102 of the tensioning heads which each form the transition from the tensioning heads 24, 26 to the tensioning band 12. As can be seen in FIG. 6, the abutment point 96, 98 is located in every case closer in the radial direction of the receiving space 20 to the receiving space 20 than the center axis 104 of the tensioning element 30 or closer to the respective base point 100, 102 than the center axis 104 of the tensioning element 30. As a result, the bending strain on the tensioning heads 24, 26 is significantly reduced so that a more uniform distribution of stress in the tensioning band 12 is able to be achieved. In order to strengthen this effect, the tensioning heads 24, 26 are additionally realized angled with respect to one another.

As the tensioning heads 24, 26 are realized symmetrically, the tensioning device 28 is able to be mounted on the tensioning band 12 with an arbitrary alignment. On the one hand, the fixing of the abutment points 96, 98 is effected as a result of the intermediate elements 56, 58. On the other hand, the tensioning device 28 or the tensioning parts 32 abut flatly against the intermediate elements 56, 58 so that an improved transmission of force is effected from the tensioning device 28 to the tensioning heads 24, 26.

Figure 7:
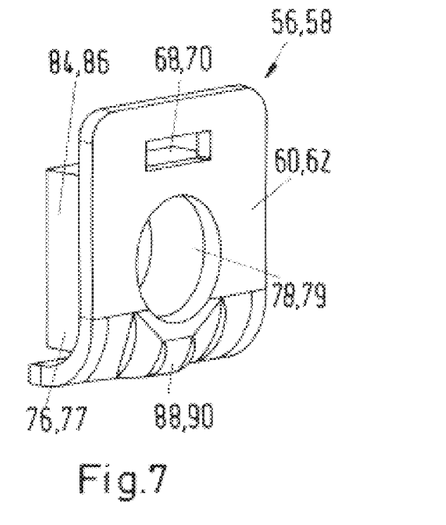
FIG. 7 shows a second embodiment of an intermediate element for use with the tensioning band from FIG. 1.

A second embodiment of the intermediate elements 56, 58 is shown in FIGS. 7 and 8. The design corresponds substantially to the intermediate elements 56, 58 shown in FIGS. 5 and 6. Simply, the abutment for the tensioning device is not provided. The tensioning element 32 consequently abuts directly against the filler 76.

Figure 9A:
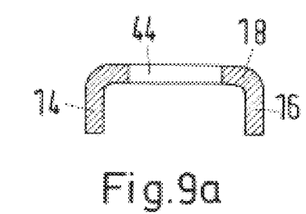
FIGS. 9*a* to 9*e* show sectional views through the profiled clamp in the sections a-a to e-e from FIG. 1.
Figure 9B:
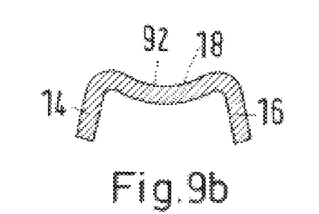

As can be seen in FIGS. 9a to 9e, the profiled clamp 10 comprises different cross-sectional forms in the circumferential direction. The profiled clamp has a substantially U-shaped cross section in the region of the tensioning heads (FIG. 9a). The cross section changes in the transition region to the tensioning band 12 or at the base points 100, 102 such that it is substantially U-shaped, as a result of which the indentations 92, 94 are formed.

Figure 9C:
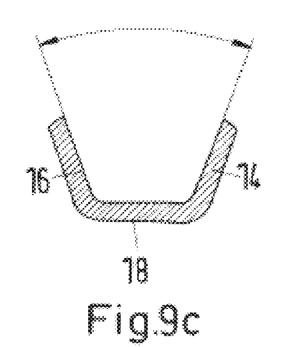
Figure 9D:
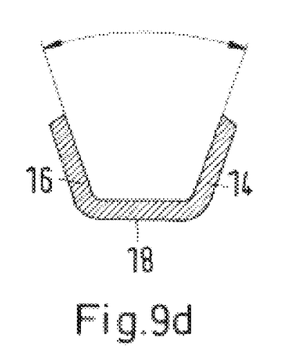
Figure 9E:
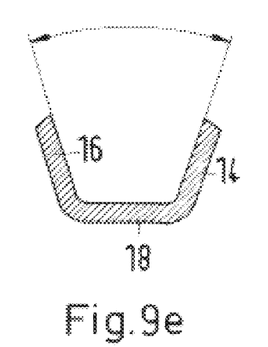

The cross section is substantially U-shaped in the region of the tensioning band 12, the legs 14, 16 being at an angle with respect to one another. The angle decreases, for example, from the cross section C-C to the cross section e-e. With the profiled clamp 10 mounted, this results in a more uniform distribution of stress inside the tensioning band 12. For example, the angle of the legs 14, 16 is 39.6° in the section c-c, 38.1° in the section d-d and 34.4° in the section e-e. However, the angles can also assume other values as long as a uniform distribution of stress is ensured in the tensioning band 12. The angle is preferably between 45 and 30°.

The invention is not limited to one of the embodiments described above but is modifiable in diverse ways. The intermediate elements 56, 58 must simply be realized such that the abutment point 96, 98 between the intermediate elements 56, 58 and the tensioning heads 24, 26 is located in each case closer radially to the base point 100, 102 of the respective tensioning head 24, 26 than the center axis 104 of the tensioning element 30.

For example, each of the tensioning heads 24, 26 can also comprise a portion which connects directly to the respective end of the tensioning band 20 and is curved in the opposite direction to the curvature of the tensioning band 20, the abutment points 96, 98 being located in each case on said curved portions of the tensioning heads 24, 26. In particular, the curvature of the curved portions is greater than a curvature of the abutment surfaces 60, 62 that is present as an option.

Figure 10:
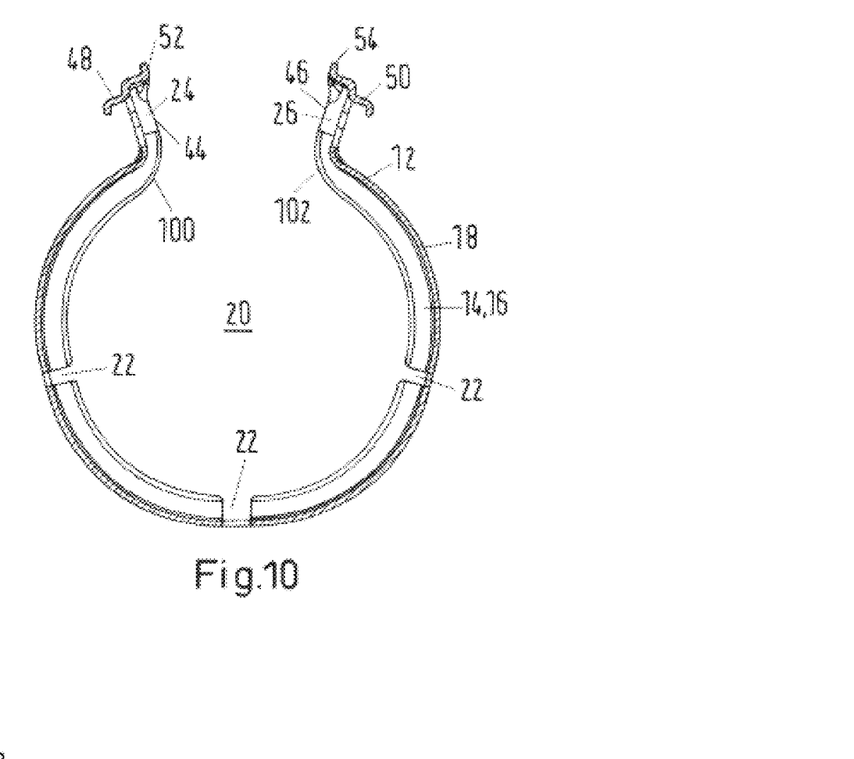
FIG. 10 shows a second embodiment of a profiled clamp.
Figure 11A:
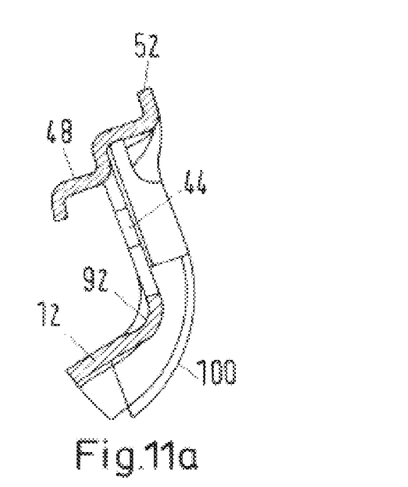
FIGS. 11*a* and 11*b* show views of a detail of the tensioning head of the profiled clamp from FIG. 10.
Figure 11B:
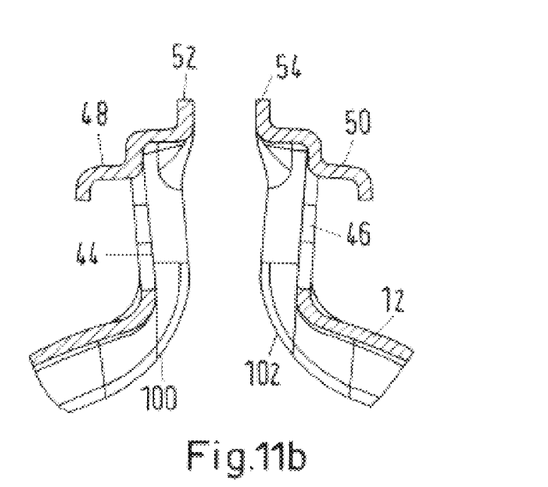

FIG. 10 as well as 11a and 11b show a second embodiment of a profiled clamp. The design of said profiled clamp 10 corresponds substantially to the profiled clamp 10 that has been described above. The projections 48, 50, however, do not comprise any latching elements but are bent radially inward in each case at their end. The bent ends form a hook-shaped locking device which prevents the intermediate elements 56, 58 from slipping off.

All the features and advantages produced from the claims, the description and the drawing, including structural details, spatial abutments and method steps, can be essential to the invention both on their own per se and in the most varied combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

List of references

| | |
|---|---|
| 10 | Profiled clamp |
| 12 | Tensioning band |
| 14 | Leg |
| 16 | Leg |
| 18 | Connecting region |
| 20 | Receiving space |
| 22 | Interruptions |
| 24 | Tensioning head |
| 26 | Tensioning head |
| 28 | Tensioning device |
| 30 | Tensioning element |

-continued

List of references

| | |
|---|---|
| 32 | Tensioning part |
| 34 | Tensioning part |
| 36 | Pipes |
| 38 | Pipes |
| 40 | Flange |
| 42 | Flange |
| 44 | Opening |
| 46 | Opening |
| 48 | Projections |
| 50 | Projections |
| 52 | Contact surface |
| 54 | Contact surface |
| 56 | Intermediate elements |
| 58 | Intermediate elements |
| 60 | Abutment surface |
| 62 | Abutment surface |
| 64 | Abutment |
| 66 | Abutment |
| 68 | Recesses |
| 70 | Recesses |
| 72 | Latching elements |
| 74 | Latching elements |
| 76 | Filler |
| 77 | Filler |
| 78 | Recess |
| 79 | Recess |
| 80 | Plates |
| 82 | Plates |
| 84 | Reception |
| 86 | Reception |
| 88 | Projection |
| 90 | Projection |
| 92 | Indentation |
| 94 | Indentation |
| 96 | Abutment point |
| 98 | Abutment points |
| 100 | Base point |
| 102 | Base point |
| 104 | Center axis |

The invention claimed is:

1. A profiled clamp, comprising a tensioning band and a tensioning device, wherein the tensioning band comprises at each end a tensioning head which protrudes radially in a substantial manner with reference to a receiving space which is defined by the profiled clamp, said tensioning heads each having an opening, and wherein the tensioning device comprises two tensioning parts and one elongated tensioning element which connects the tensioning parts, wherein the tensioning element extends through the openings of the tensioning heads and presses the tensioning parts against the tensioning heads, wherein the profiled clamp comprises intermediate elements which are provided between the tensioning heads and the tensioning parts, wherein the intermediate elements comprise recesses through which the tensioning element extends, as well as an abutment surface for abutment against the tensioning head, wherein the abutment surface is realized in such a manner that an abutment point between the intermediate element and the tensioning head at least in a tensioning position in which the tensioning heads are parallel to one another or are angled with respect to one another, is located in each case closer in a radial direction to the receiving space than a center axis of the tensioning element, wherein the intermediate element comprises a reception for a filler or the tensioning part of the tensioning device.

2. The profiled clamp as claimed in claim 1, wherein the tensioning band is curved about the receiving space and the tensioning heads each comprise a portion which connects directly to the respective end of the tensioning band and is curved in an opposite direction to a curvature of the tensioning band, wherein the abutment points are each located on a curved portion of the tensioning head.

3. The profiled clamp as claimed in claim 1, wherein the intermediate elements each comprise a rounded abutment surface, wherein curvature of the abutment surfaces is in particular smaller than curvature of curved portions of the tensioning heads.

4. The profiled clamp as claimed in claim 3, wherein the abutment surfaces each comprise a projection which protrudes in a circumferential direction (U), wherein the projection is provided in each case closer in the radial direction to the receiving space than the openings of the tensioning head.

5. The profiled clamp as claimed in claim 1, wherein interacting holding elements which fix the intermediate elements in the radial direction and in a rotational direction about a longitudinal axis of the tensioning element are provided on the intermediate elements and the tensioning heads.

6. The profiled clamp as claimed in claim 5, wherein the holding elements are each formed by at least one recess on the intermediate element or on the tensioning head and at least one projection which is provided on the tensioning head or the intermediate element and protrudes into the recess.

7. The profiled clamp as claimed in claim 6, wherein the projection is bent from the tensioning head.

8. The profiled clamp as claimed in claim 1, wherein the tensioning part with an internal thread is provided in the reception and the filler with a cylindrical recess is provided in a second reception.

9. The profiled clamp as claimed in claim 1, wherein the intermediate elements each comprise an abutment for the tensioning part.

10. The profiled clamp as claimed in claim 1, wherein the tensioning heads are realized at an angle with respect to one another.

11. The profiled clamp as claimed in claim 1, wherein mutually opposite contact surfaces are provided on radially outer ends of the tensioning heads.

12. The profiled clamp as claimed in claim 1, wherein an introduction of tensioning force into the tensioning band at the abutment point constitutes a sole introduction of tensioning force via the intermediate elements into the tensioning band.

* * * * *